United States Patent
Wulff et al.

(10) Patent No.: US 11,917,402 B2
(45) Date of Patent: Feb. 27, 2024

(54) DIGITAL RADIO COMMUNICATIONS

(71) Applicant: Nordic Semiconductor ASA, Trondheim (NO)

(72) Inventors: Carsten Wulff, Trondheim (NO); Pål Håland, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 124 days.

(21) Appl. No.: 17/538,839

(22) Filed: Nov. 30, 2021

(65) Prior Publication Data
US 2022/0174484 A1    Jun. 2, 2022

(30) Foreign Application Priority Data
Dec. 1, 2020 (GB) .................... 2018926

(51) Int. Cl.
*H04W 12/0471* (2021.01)
*H04L 9/40* (2022.01)
*H04W 8/00* (2009.01)

(52) U.S. Cl.
CPC ..... *H04W 12/0471* (2021.01); *H04L 63/0428* (2013.01); *H04L 63/0876* (2013.01); *H04W 8/005* (2013.01)

(58) Field of Classification Search
CPC .......... H04L 2209/42; H04L 2209/805; H04L 63/0407; H04L 63/0428; H04L 63/0876; H04L 9/12; H04W 12/02; H04W 12/0471; H04W 12/08; H04W 4/80; H04W 8/005
See application file for complete search history.

(56) References Cited

U.S. PATENT DOCUMENTS

| 9,769,664 B1 | 9/2017 | Kavaler |
| 10,855,643 B2 * | 12/2020 | Zhang ............. H04W 12/02 |
| 2006/0274643 A1 | 12/2006 | Choyi et al. |

(Continued)

FOREIGN PATENT DOCUMENTS

| GB | 2494550 A | 3/2013 |
| JP | 2002-215030 | 7/2002 |

OTHER PUBLICATIONS

Zhang, Yue et al. Bluetooth Low Energy (BLE) Security and Privacy (2019). (Year: 2019).*

(Continued)

*Primary Examiner* — Michael Simitoski
(74) *Attorney, Agent, or Firm* — Klarquist Sparkman, LLP

(57) ABSTRACT

A method of digital radio communication between a first device and a second device is disclosed. An advertising packet is transmitted between first and second devices, wherein the packet includes a first address and a data portion. Additionally, an encryption key is transmitted between the devices. The first device generates a second address by encrypting an identity value derived from part of the first address using the encryption key and the data portion. The result is encrypted to generate second portion of the second address. The first device then transmits a connection request including the second address. The second device decrypts the second portion and uses the encryption key to determine correspondence with the first portion. If said correspondence is determined, the second device decrypts the first portion using at least the encryption key and compares it to an expected identity value derived from the first address.

10 Claims, 3 Drawing Sheets

(56) References Cited

U.S. PATENT DOCUMENTS

| | | | |
|---|---|---|---|
| 2010/0303236 A1 | 12/2010 | Laaksonen et al. | |
| 2012/0257753 A1 | 10/2012 | Ochikubo et al. | |
| 2013/0045684 A1 | 2/2013 | Linde et al. | |
| 2013/0064372 A1 | 3/2013 | Delport et al. | |
| 2014/0105396 A1* | 4/2014 | Engelien-Lopes | H04W 12/50 380/270 |
| 2017/0372600 A1* | 12/2017 | Palin | H04W 4/80 |
| 2018/0020492 A1* | 1/2018 | Dao | H04L 41/0806 |
| 2019/0074975 A1* | 3/2019 | Koskimies | H04W 12/126 |
| 2021/0227368 A1* | 7/2021 | Krebs | H04W 12/069 |

OTHER PUBLICATIONS

IPO Search Report under Section 17(5) for GB2018926.2, dated Aug. 3, 2021, 3 pages.
Specification of the Bluetooth System, Covered Core Package version: 4.0, vol. 3, Part C, Section 10, Publication Date: Jun. 30, 2010, 30 pages.

* cited by examiner

DIGITAL RADIO COMMUNICATIONS

CROSS-REFERENCE TO RELATED APPLICATION

This application claims priority to United Kingdom Patent Application No. GB2018926.2, filed Dec. 1, 2020, which application is incorporated herein by reference in its entirety.

FIELD

This invention relates to short-range, ad hoc radio communication networks. Such networks, which include for example legacy Bluetooth™ and Bluetooth™ Low Energy (BLE) have many uses for transferring data between, and controlling, a whole variety of different devices.

BACKGROUND

In order for two devices to connect under Bluetooth™ it is necessary for one of them to transmit a connection request using its address.

An important area of concern to many users of Bluetooth™ devices however is that of privacy: i.e. ensuring that untrusted parties are not able to track a device by its advertised address. In order to mitigate this concern, BLE supports an approach using what is known as a resolvable private address (RPA). The RPA includes a portion which is a randomly generated number and another portion which is derived from the random number by calculating a hash function using a key. The key is shared by the device with trusted peers during a prior Bonding process following initial pairing and those peers can therefore subsequently use the key to generate an RPA which the device can resolve and so verify that the peer seeking to connect to it is trusted.

The BLE protocol further specifies that the random part of the RPA is changed regularly—e.g. every 15 minutes. Whilst trusted peers that hold the device's key will still be able to generate new RPAs that the device can resolve thus be verified by the device, this prevents untrusted devices, which do not have the key, from connecting to or tracking the device.

In one form of attack which has been devised, a rogue device will intercept and store the addresses shared by peers in order to use these to try to trick the device into connecting with the rogue device. The device can seek to defeat such attacks by storing addresses that it receives from trusted peers in memory and refusing to connect to a potential peer if the address included in the connection request is one it has seen before more than 15 minutes ago, after which a legitimate peer should have changed its RPA. However the device will typically have a limited memory available to store such addresses and thus such a defence is of limited effectiveness.

When viewed from a first aspect the present invention provides a method of digital radio communication between a first device and a second device comprising:
one of the first and second devices transmitting to the other an advertising packet comprising a first address and a further data portion;
one of the first and second devices transmitting to the other at least one encryption key;
the first device generating a second address by:
encrypting an identity value derived from at least part of said first address using said encryption key and said further data portion, to provide a first portion of the second address; and
encrypting the first portion using the encryption key or a further encryption key to generate a second portion of the second address;
said first device transmitting to the second device a connection request or further advertising packet comprising said second address;
the second device receiving said connection request or further advertising packet, decrypting said second portion of said second address using said encryption key or said further encryption key to determine correspondence with said first portion;
if said correspondence is determined, the second device decrypting said first portion using the encryption key, said identity value and said further data portion; and
said second device comparing said first portion to an expected identity value derived from the first address.

Thus it will be seen by those skilled in the art that in accordance with the invention an approach compatible with the resolvable private address outlined above may be used, but that rather than the first portion simply comprising a random number, it is generated by encrypting an identity value derived from at least part of the first address communicated in the initial advertising packet. In other words when the first device wishes to communicate subsequently with the second device, the random portion of the RPA is replaced with an encrypted message which only the intended recipient (i.e. the second device) can decrypt. As long as the first device and second device derived the identity value from the first address in the same way, the second device will therefore be able to verify the connection request from the first device without having to store a large number of previously used addresses. The second device may ignore the connection request or further advertising packet if the first portion does not match the expected identity value. This allows for communication to be more secure against replay attacks without compromising privacy.

Since in accordance with the BLE standard, the first portion of the RPA is simply a random value, devices operating in accordance with the present invention may be backwards-compatible with standard BLE devices.

The identity value could be derived from the part of the first address in any of a number of ways. In a set of embodiments the identity value comprises a counter. Thus the initial count value could be provided in the advertising packet as part of the first address and the count value incremented by the first and second devices in the same way—e.g. when a further advertising packet containing different data is received.

The encryption key used to encrypt the second portion of the second address (in accordance with the BLE RPA principle) could be the same as the encryption key used to generate the encrypted message within the first portion. This could allow the invention to be implemented using a legacy form of advertising packet defined in BLE in which only one encryption key is accommodated. In other embodiments however a specific further, different encryption key is used. This may be used when the BLE Extended Advertising packet is used, although the Applicant has recognised that an approach outside the BLE protocol could be used to provide an additional encryption key.

In accordance with the invention the advertising packet comprises a further data portion which is used to encrypt the identity value—i.e. it acts as an encryption nonce. The further data portion may be random data and may be provided at any convenient part of the advertising packet. The Applicant has further recognised that use of the BLE Extended Advertising packet can accommodate the further data specified in accordance with the invention, although again an approach to providing this outside the BLE protocol could be used.

In a set of embodiments the further data portion is encrypted using the encryption key to provide encrypted data and said encrypted data is subsequently combined with the identity value in a combination operation to provide the first portion of the second address. The combination operation may comprise performing an exclusive-OR (XOR) operation on the encrypted data and identify value respectively.

In accordance with the invention one of the devices transmits the advertising packet with the first address and the further data portion. This could be the first device (i.e. the one which generates the second address) or the second device since it is only important that both devices have the same information.

Similarly in accordance with the invention one of the devices transmits the encryption key. This could be the first device or the second device since and could be the same device which transmits the advertising packet with the first address and the further data portion or it could be the other device.

In a set of embodiments the first and second devices operate in accordance with a Bluetooth™ specification. Thus the second address may comprise a Resolvable Private Address in accordance with the BLE specification. The first portion of the second address may therefore include a two bit identifier (e.g. '01') in its most significant bits to indicate that the address is resolvable.

The first device could be a central device and the second device a peripheral device as defined in BLE.

In a set of embodiments the second device generates a third address by:
  encrypting an identity value derived from at least part of said first address using said encryption key and a shared data portion, to provide a first portion of the third address; and
  encrypting the first portion using the encryption key or the further encryption key to generate a second portion of the third address;
said second device transmitting to the first device a connection request or further advertising packet comprising said third address.

The first device may:
  decrypt said second portion of said third address using said encryption key or said further encryption key to determine correspondence with said first portion;
  if said correspondence is determined, decrypt said first portion using the encryption key, said identity value and said shared data portion; and
  compare said first portion to an expected identity value derived from the first address.

Thus it will be seen that both the first and second devices may generate encrypted addresses which can be used to prevent tracking in accordance with the invention. The shared data portion could be any convenient data. It could be the further data portion referred to hereinabove but in set of embodiments is different—e.g. comprising an identity address of the second device.

When viewed from a second aspect the invention provides a peripheral digital radio communication device arranged to:
  transmit to a central device an advertising packet comprising a first address and a further data portion;
  generate a second address by:
    encrypting an identity value derived from at least part of said first address using an encryption key and said further data portion, to provide a first portion of the second address; and
    encrypting the first portion using the encryption key or a further encryption key to generate a second portion of the second address;
  transmit to the central device a further advertising packet comprising said second address.

This aspect of the invention also extends to a corresponding method of operating the peripheral device.

When viewed from a third aspect the invention provides a central digital radio communication device arranged to:
  receive from a peripheral device an advertising packet comprising a first address and a further data portion;
  generate a second address by:
    encrypting an identity value derived from at least part of said first address using an encryption key and said further data portion, to provide a first portion of the second address; and
    encrypting the first portion using the encryption key or a further encryption key to generate a second portion of the second address;
  transmit to the peripheral device a connection request comprising said second address.

This aspect of the invention also extends to a corresponding method of operating the central device.

In accordance with either the second or third aspects, in respective sets of embodiments the peripheral/central device is further arranged to:
  receive a connection request or further advertising packet comprising a third address having a first portion and a second portion;
  decrypt said second portion of said third address using said encryption key or said further encryption key to determine correspondence with said first portion;
  if said correspondence is determined, decrypt said first portion using the encryption key, said identity value and a shared data portion; and
  compare said first portion to an expected identity value derived from the first address.

Thus it will be similarly be seen that either or both of the central and peripheral devices may receive and decrypt encrypted addresses as well as generating them which can be used to prevent tracking in accordance with the invention. As above, the shared data portion could be any convenient data. It could be the further data portion referred to hereinabove but in set of embodiments is different—e.g. comprising an identity address of the central or peripheral device.

Features of any aspect or embodiment described herein may, wherever appropriate, be applied to any other aspect or embodiment described herein. Where reference is made to different embodiments, it should be understood that these are not necessarily distinct but may overlap.

BRIEF DESCRIPTION OF DRAWINGS

An embodiment of the invention will now be described, by way of example only, with reference to the accompanying drawings in which.

DETAILED DESCRIPTION OF EMBODIMENTS

Figure 1:
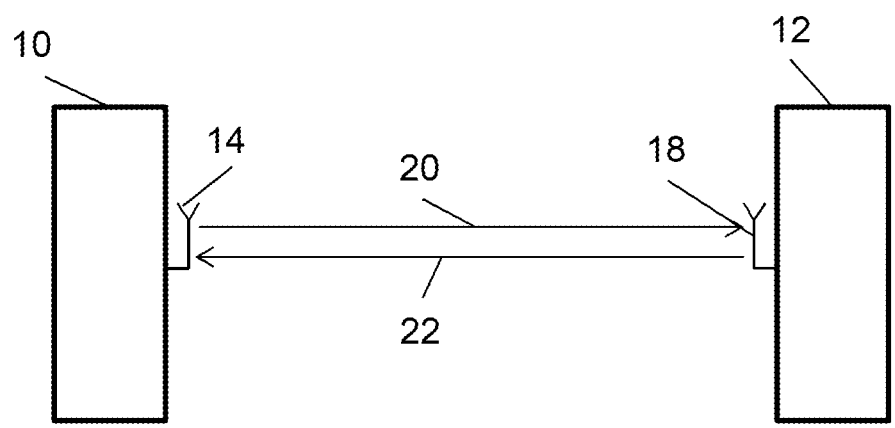
FIG. 1 is a schematic diagram illustrating a typical radio communication system.

FIG. 1 shows a radio system comprising a first, central radio transceiver device 10 compatible with Bluetooth™ Low Energy™, a second, peripheral radio transceiver device 12 also compatible with Bluetooth™ Low Energy™. Hereafter, these will be referred to as the central device 10 and peripheral device 12. The central device 10 comprises an antenna 14 and the peripheral 12 comprises an antenna 18.

As will also be well understood by those skilled in the art, a number of standard modules such as processors, oscillators, filters, amplifiers, digital to analogue converters (DACs) and analogue to digital converters (ADCs) are provided in the radio transceivers 10 and 12 but the description of these is omitted for the sake of brevity.

FIG. 1 also shows the signal paths 20 and 22 of the radio signals. Signal path 20 is from the central device 10 when acting as a transmitter through its antenna 14 to the peripheral 12 when acting as a receiver through its antenna 18. Signal path 22 is from the peripheral 12 when acting as a transmitter through its antenna 18 to the central device 10 when acting as a receiver through its antenna 14.

Figure 2:
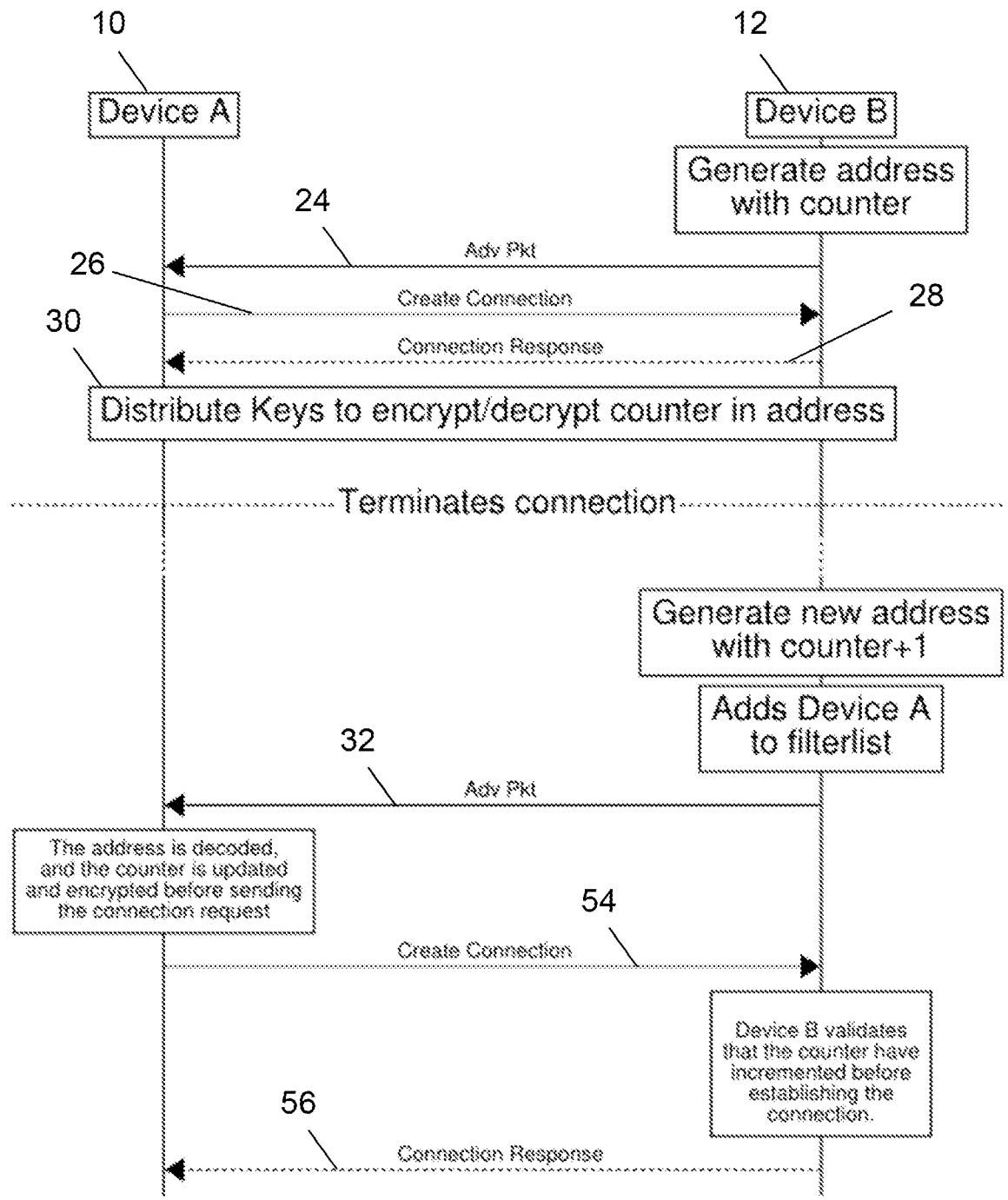
FIG. 2 is a schematic diagram illustrating communication between the two devices in accordance with the invention.

FIG. 2 shows a possible communication procedure between the central and peripheral devices 10, 12. To begin, the peripheral device 12 generates a first address which includes a counter value. It also generates a further data portion in the form of a random number (not shown). The first address including the counter and the random data portion are transmitted in a BLE Extended Advertising packet 24.

The central device 10 receives the advertising packet 24, stores the first address and random data portion and then transmits a connection request 26 to the peripheral device 12 including its address. In the particular embodiment described here this is an 'open' identity address as the devices have not connected before. In other arrangements it could be encrypted. The peripheral device 12 then transmits a connection response 28 so that a connection is established.

Thereafter the two devices 10,12 enter a bonding process 30 whereby two encryption keys (referred to as Key A and Key B below) are exchanged. These could be generated by either device or each device could generate one. In other embodiments a single encryption key is exchanged.

At some time later the connection between the devices 10, 12 is terminated. This could be through one of the devices disconnecting, powering down etc. or simply the devices moving out of range of one another. Thereafter the peripheral device 12 generates a new address (e.g. because more than 15 minutes has elapsed), also including a counter value but in which the counter value is incremented by one (or any other predetermined value) compared to that in the first advertising packet 24. The peripheral device 12 also adds the central device 10, including its identity address, to a list of trusted devices (a 'filterlist'). This could equally be done before the connection is broken.

The peripheral device 12 transmits another advertising packet 32 including the newly generated address with the incremented counter in encrypted form using the technique described in greater detail below with reference to FIG. 3

Figure 3:
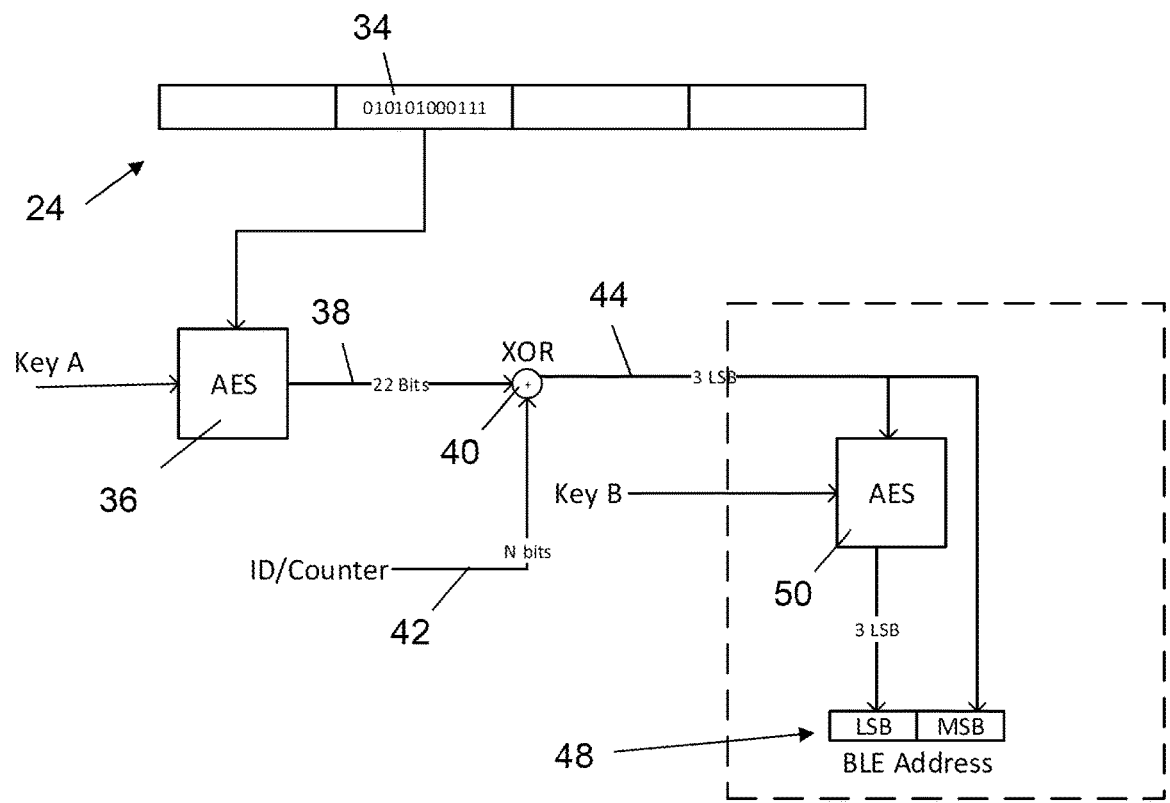
FIG. 3 is a schematic diagram illustrating how the packet address is constructed in accordance with the invention.
Figure 4:
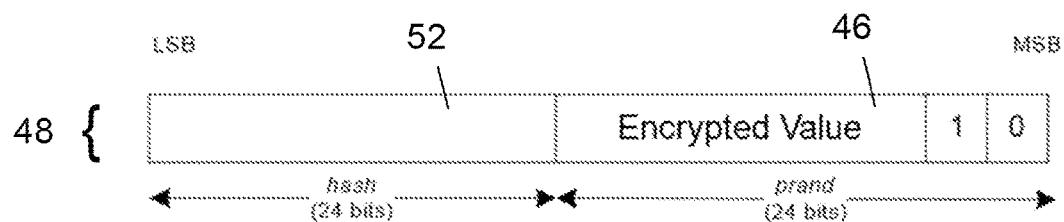
FIG. 4 is an illustration of an address structure generated by the system of FIG. 3.

FIG. 3 shows schematically how the peripheral device 12 generates the encrypted address for transmission to the central device 10. The format of the address generated is shown in FIG. 4.

Part of the structure of the first advertising packet 24 that the peripheral device previously sent is shown schematically, a portion of which contains the random data 34 referred to earlier. The random data 34 is fed to an Advanced Encryption Standard (AES) module 36 which uses one of the two encryption keys ('Key A') received during the bonding process 30 to encrypt the random data 34 to produce a 22-bit encrypted stream 38 which is passed to an XOR logic gate 40. The other input to the XOR logic gate 40 is the current counter value 42 calculated by the device 12. The output 44 of the XOR gate 40 is therefore an encrypted value representing the new address incremented by the current counter value. This is used in the first portion ('prand') 46 of the generated address 48 (see FIG. 4). The first portion 46 is completed by addition of the digits '01' in the two most significant bits respectively.

The encrypted counter value 44 is also fed to a second AES module 50 which uses the second of the two encryption keys ('Key B') received during the bonding process 30 to encrypt the first portion of the 46 of the generated address (including the '01' prefix) to produce a 24-bit hash value which forms the second portion 52 of the generated address 48. As will be recognised by those skilled in the art, the generated address 48 is therefore in the standard BLE resolvable private address (RPA) form except that instead of the first portion being a random value, it is an encrypted version of the counter value.

With additional reference again to FIG. 2, the second advertising packet 32 including the encrypted address 48 is received by the central device 10. The central device 10 increments its counter as a result of receiving another advertising packet then decrypts the second portion 52 using key B stored during the bonding process 30 and compares this to the first portion 46. Assuming they match, the central device 10 then proceeds to decrypt the first portion 46 using key A and the random data nonce 34 it received from the first advertising packet 24 and compares the counter value with its own counter value to check that the newly received counter value is equal to or higher than its stored counter value. Assuming this is the case, the central device 10 generates another encrypted address for transmission to the peripheral device 12, also in accordance with the procedure explained above with reference to FIGS. 3 and 4. However in this instance the central device 10 uses its own address as the nonce to feed into the first AES module 36. The encrypted address is included in a connection request packet 54 received by the peripheral device 12.

The peripheral device 12 then performs a similar decryption to check the embedded counter value, compare to its own and use that to verify the central device 10. If verification is successful, the connection is accepted and a connection response 56 is transmitted back to the central device 10. Thereafter the two devices 10, 12 can share data. If the address in the connection request 54 cannot be verified, the peripheral device 12 does not issue a connection response and thus no connection is established.

It will be appreciated that if a rogue device were to intercept the connection request 54, store it and subsequently use the stored packet to try to connect to the peripheral device 12 in a replay attack, this would be unsuccessful since the counter value it contains would no longer match the counter value held by the peripheral device. This can prevent the peripheral device 12 from being tracked or hacked. Similarly the central device 10 cannot be compromised by intercepting the second advertising packet 32, It will be appreciated by those skilled in the art that the inventive principles set out herein can be implemented in many different ways and are not limited to the example described above. For example either or both of the devices could generate and transmit encrypted addresses as described herein so that the other device can validate the address without presenting a risk of the device being tracked or suffering from a replay attack.

The invention claimed is:

1. A method of digital radio communication between a first device and a second device comprising:
   one of the first and second devices transmitting to the other an advertising packet comprising a first address and a further data portion;
   one of the first and second devices transmitting to the other at least one encryption key;
   the first device generating a second address by:
      encrypting an identity value derived from at least part of said first address using said encryption key and said further data portion, to provide a first portion of the second address; and
      encrypting the first portion using the encryption key or a further encryption key to generate a second portion of the second address;
   said first device transmitting to the second device a connection request or further advertising packet comprising said second address;
   the second device receiving said connection request or further advertising packet, decrypting said second portion of said second address using said encryption key or said further encryption key to determine correspondence with said first portion;
   if said correspondence is determined, the second device decrypting said first portion using the encryption key, said identity value and said further data portion; and
   said second device comparing said first portion to an expected identity value derived from the first address.

2. The method as claimed in claim 1 comprising the second device ignoring the connection request or further advertising packet if the first portion does not match the expected identity value.

3. The method as claimed in claim 1 wherein the identity value comprises a counter.

4. The method as claimed in claim 1 comprising encrypting the further data portion using the encryption key to provide encrypted data and subsequently combining said encrypted data with the identity value in a combination operation to provide the first portion of the second address.

5. The method as claimed in claim 4 wherein the combination operation comprises performing an exclusive-OR operation on the encrypted data and identify value respectively.

6. The method as claimed in claim 1 wherein the first and second devices operate in accordance with a Bluetooth™ specification.

7. The method as claimed in claim 1 further comprising the second device generating a third address by:
   encrypting an identity value derived from at least part of said first address using said encryption key and a shared data portion, to provide a first portion of the third address; and
   encrypting the first portion using the encryption key or the further encryption key to generate a second portion of the third address;
   said second device transmitting to the first device a connection request or further advertising packet comprising said third address.

8. The method as claimed in claim 7 further comprising the first device:
   decrypting said second portion of said third address using said encryption key or said further encryption key to determine correspondence with said first portion;
   if said correspondence is determined, decrypting said first portion using the encryption key, said identity value and said shared data portion; and
   comparing said first portion to an expected identity value derived from the first address.

9. A peripheral digital radio communication device arranged to:
   transmit to a central device an advertising packet comprising a first address and a further data portion;
   generate a second address by:
   encrypting an identity value derived from at least part of said first address using an encryption key and said further data portion, to provide a first portion of the second address;
   encrypting the first portion using the encryption key or a further encryption key to generate a second portion of the second address;
   transmit to the central device a further advertising packet comprising said second address;
   receive a connection request comprising a third address having a first portion and a second portion;
   decrypt said second portion of said third address using said encryption key or said further encryption key to determine correspondence with said first portion;
   if said correspondence is determined, decrypt said first portion using the encryption key, said identity value and a shared data portion; and
   compare said first portion to an expected identity value derived from the first address.

10. A central digital radio communication device arranged to:
   receive from a peripheral device an advertising packet comprising a first address and a further data portion;
   generate a second address by:
   encrypting an identity value derived from at least part of said first address using an encryption key and said further data portion, to provide a first portion of the second address;
   encrypting the first portion using the encryption key or a further encryption key to generate a second portion of the second address;
   transmit to the peripheral device a connection request comprising said second address;
   receive a further advertising packet comprising a third address having a first portion and a second portion;
   decrypt said second portion of said third address using said encryption key or said further encryption key to determine correspondence with said first portion;
   if said correspondence is determined, decrypt said first portion using the encryption key, said identity value and a shared data portion; and
   compare said first portion to an expected identity value derived from the first address.

* * * * *